United States Patent [19]
Putty et al.

[11] Patent Number: 5,450,751
[45] Date of Patent: Sep. 19, 1995

[54] MICROSTRUCTURE FOR VIBRATORY GYROSCOPE

[75] Inventors: Michael W. Putty, East Pointe; David S. Eddy, Washington, both of Mich.

[73] Assignee: General Motors Corporation, Detroit, Mich.

[21] Appl. No.: 55,880

[22] Filed: May 4, 1993

[51] Int. Cl.$^6$ ............................................. G01P 15/14
[52] U.S. Cl. ..................................................... 73/504.18
[58] Field of Search ............................ 73/505, 517 R

[56] References Cited

U.S. PATENT DOCUMENTS

| | | | |
|---|---|---|---|
| 3,113,463 | 12/1963 | Holt, Jr. ................................. | 73/505 |
| 3,559,492 | 2/1971 | Erdley .................................. | 73/505 |
| 4,849,070 | 7/1989 | Bly et al. ............................. | 156/643 |
| 4,851,080 | 7/1989 | Howe et al. ......................... | 156/647 |

FOREIGN PATENT DOCUMENTS

044280A2 8/1991 European Pat. Off. .
0461761A1 12/1991 European Pat. Off. .

OTHER PUBLICATIONS

Frazier, Allen; High Aspect Ratio Electroplated Microstructure Using a Photosensitive Polyimide Process; Feb. 4-7 1992.
Englemann, Ehrmann, Reichl; Fabrication of High Depth to Width Aspect Ratio Microstructures; Feb. 4-7 1992.
Guckel et al; Deep X-ray and UV Lithographics for Micromechanics; Sep. 1990.
GBuckel et al; Thermo-Magnetic Metal Flexure Actuators; 1992.
Christenson et al; Preliminary Results for a Planar Microdyamometer; 1992.
Furuya et al; Microgrid Fabrication a Flurinated Polyimide by Using Magnetically Controlled Reactive Ion Etching; Feb. 1993.
Menz et al; The LIGA Technique-a Novel Concept for Microstructures and the Combination with SI-Technologies by Injection Molding; Sep. 1991.

*Primary Examiner*—Thomas P. Noland
*Assistant Examiner*—Christine K. Oda
*Attorney, Agent, or Firm*—Vincent A. Cichosz

[57] ABSTRACT

A microstructure for a vibratory gyroscope has a ring portion supported in such a fashion to allow substantially undamped, high-Q radial vibration. The ring portion is electrically conductive and comprises a charge plate for a plurality of radially disposed charge conductive sites around its perimeter for sensing radial displacements thereof. The ring, its support and charge conductive sites are formed within sacrificial molds on one surface of a conventional silicon substrate which may comprise a monolithic integrated circuit.

13 Claims, 6 Drawing Sheets

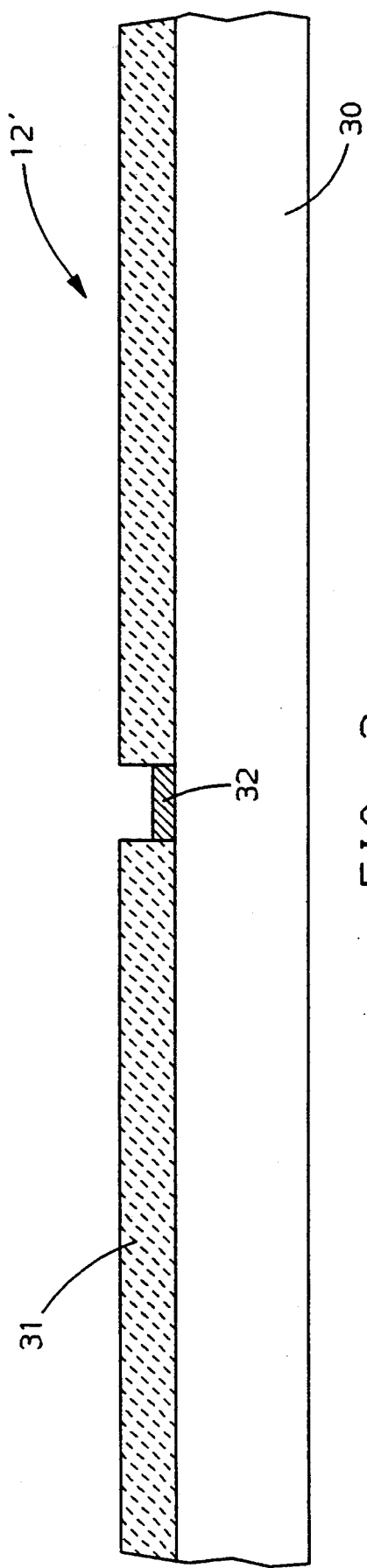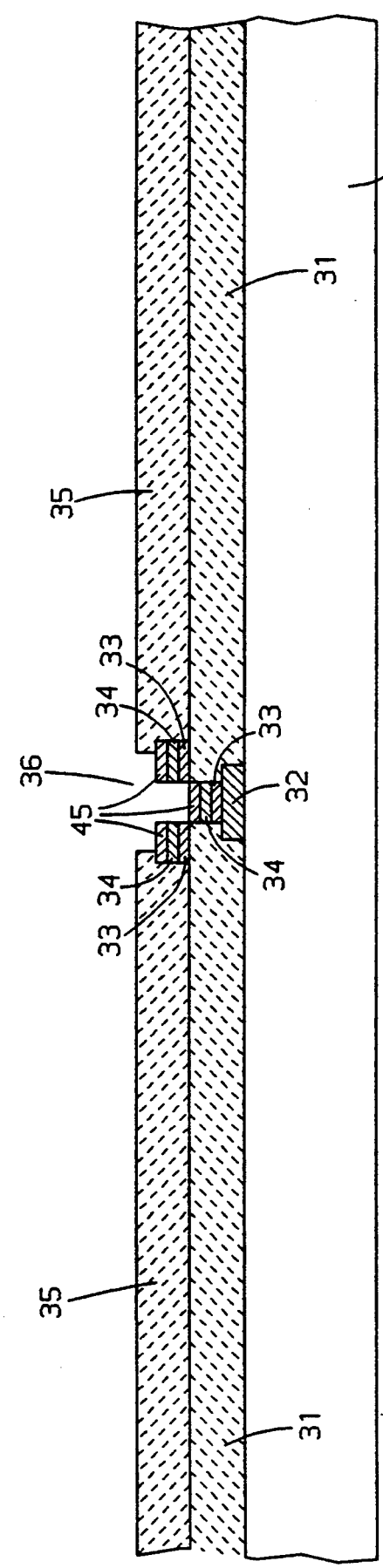

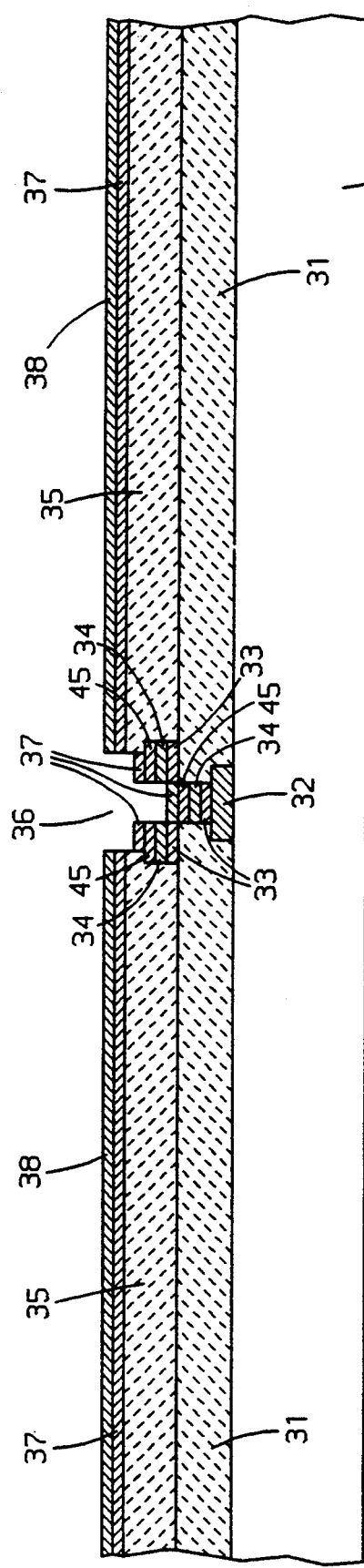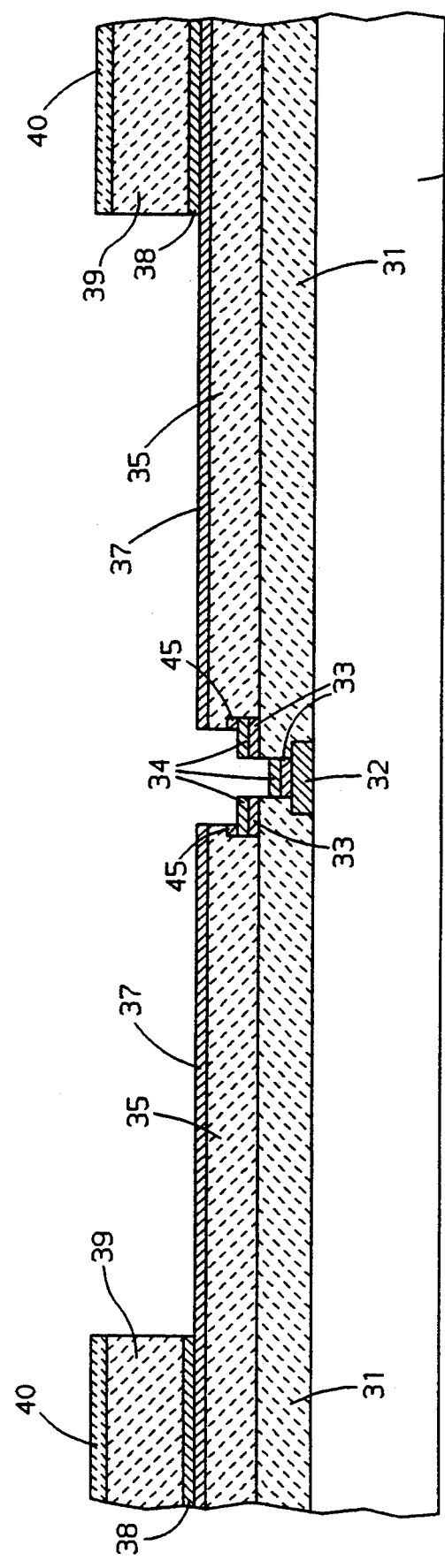

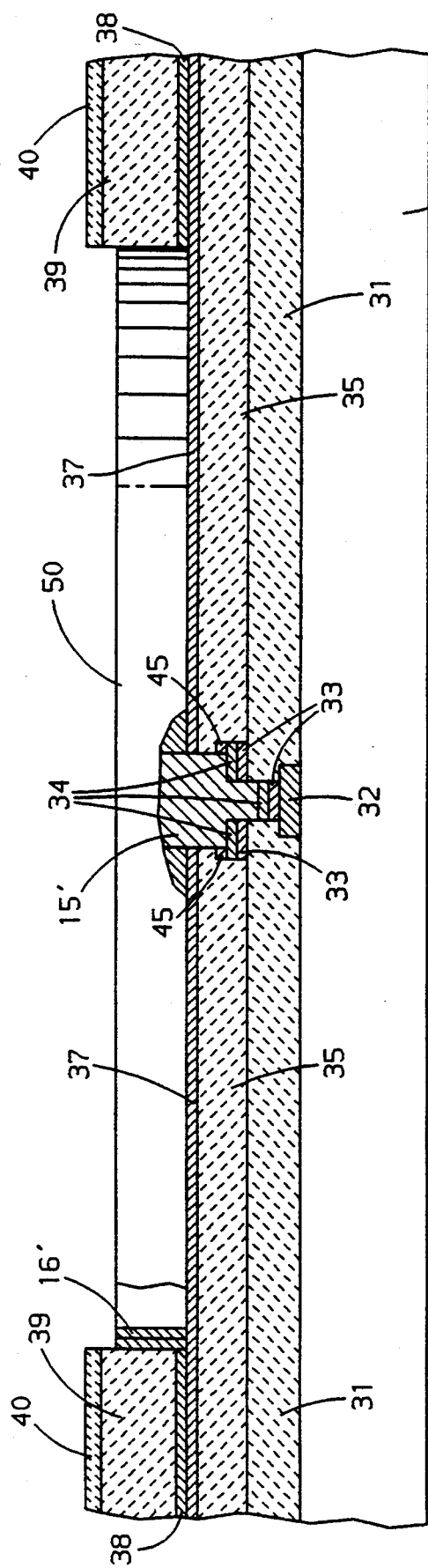
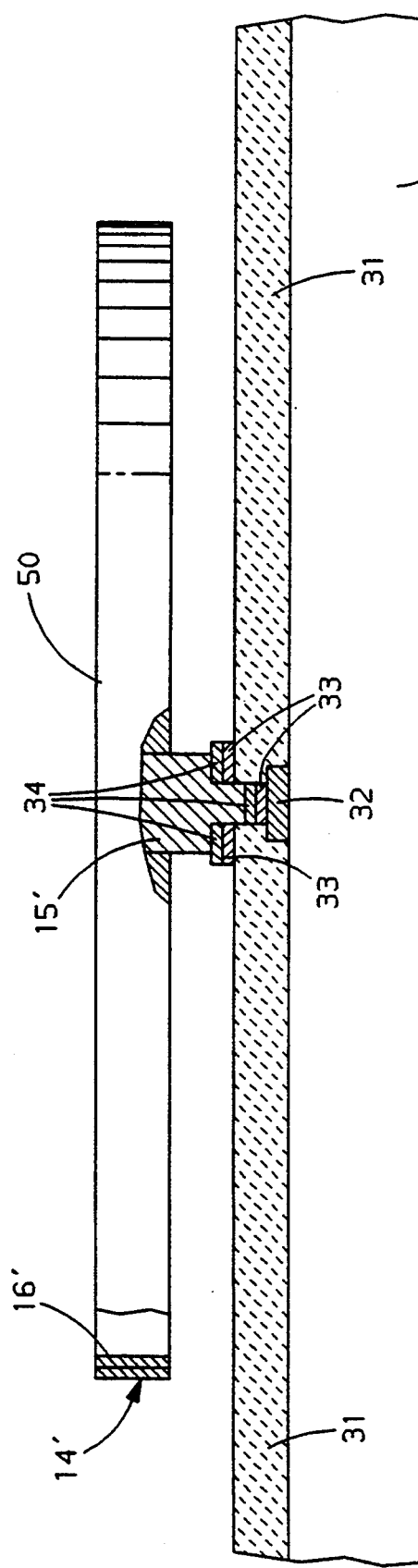
FIG. 2e
FIG. 2f

MICROSTRUCTURE FOR VIBRATORY GYROSCOPE

BACKGROUND OF THE INVENTION

This invention is founded in the field of rotation sensors as typified by devices applying vibrating mechanical elements (vibratory elements) as the rotation indication means. Numerous base forms of vibratory elements used in such vibratory rotation sensors are known including disks, tuning forks, cylinders and hemispherical shells. All such vibratory rotation sensors exploit the effects of the Coriolis force produced by the rotation of its vibratory element(s). The Coriolis force is well known to detectably influence the orientation of a resonant vibratory pattern (standing wave) in a vibratory element in proportional accordance with the rotation of the element but independent of the rate of rotation.

Perhaps the most widely known form of, vibratory rotation sensors employs three hemispherical shells as vibratory elements to detect rotation about three mutually orthogonal axes. Known in commercial avionics as Hemispherical Resonator Gyros (HRG), these devices provide a very high degree of accuracy and sensitivity at low rotation rates as required by inertial grade navigation systems. Other features of HRG include longer useful operating life, higher reliability and a more cost effective system than many alternative rotation sensing technologies for commercial and military aviation.

Other vibratory rotation sensors are intended mainly for tactical weapons guidance and control. Performance of this grade of sensor must withstand large linear and rotational accelerations characteristic of munitions. These types of sensors are more compact and less costly than HRG but are less accurate and sensitive at low rotation rates.

What are financially and functionally attractive rotation sensing packages in navigational avionics or weapons guidance are not so in other areas, for example commercial automotive electronics. Cost alone, aside from other factors such as size, mass and functional excesses or deficiencies would prohibit incorporation of such a device in an automobile for rotation sensing. A desirable automotive package would have a moderate degree of accuracy, rotation detection about a single axis, minimal size and mass, efficient design for mass manufacturing and cost commensurate with an automobile's overall price structure. Non-exhaustive exemplary system usages include vehicle navigation systems and chassis control systems such as active suspensions and active rear steering.

SUMMARY OF THE INVENTION

The present invention provides for a microstructure for a vibratory gyroscope of the variety sensing rotation about an axis. A vibratory member has a ring-like portion which supports high Q radial vibrations at a fundamental resonant frequency. Radial vibrations of the ring-like portion are sensed and utilized to define the position of a resonant standing wave pattern. Rotation of the vibratory member around the sensing axis, also the central axis of symmetry of the ring-like portion, results in precession of the standing wave pattern from the total angle of rotation. The standing wave pattern precession is independent of rotation rate and provides a direct measurement of rotation and direction thereof.

In a preferred exemplary embodiment, a microstructure has a substantially planar base and a ring-like vibratory member having a substantially cylindrical wall perpendicular to the base. Means are provided which support the ring-like vibratory member in a substantially radially undamped configuration. Preferably, such support members comprise a plurality of equally spaced spokes spanning from the ring-like vibratory member to a support member coaxial with the ring-like vibratory member and perpendicular to the base. Such spoke means are generally compliant in the radial direction and may have a generally arcuate shape. The ring-like member is electrically conductive and comprises a charge plate for a plurality of radially disposed charge conductive sites around the outer perimeter thereof.

In a preferred method of manufacturing microstructures for a vibratory gyroscope, adhesion sites are established on a base for ohmic and structural interconnection to the microstructures. Consistent with the preferred structural embodiment provided above, these adhesion sites would be established at the base of the central support member, and charge conductive sites around the perimeter of the ring-like vibratory member. An adhesion site plating base layer is established at the adhesion sites where metal microstructures will be formed and coupled. A sacrificial layer is established upon the base to provide separation of all free standing portions of the microstructures from the base. In the preferred exemplary structure, this includes areas beneath the ring-like vibratory member and also beneath the plurality of spokes supporting the ring-like vibratory member from the central support member. A sacrificial plating layer is deposited for the free standing portions of the microstructure. The microstructure are then defined out of the plane of the base by a mold having substantially vertical walls with respect to the plane of the base. The vertical walls of the mold expose therethrough the adhesion sites and the sacrificial plating base layer.

The microstructures are then electroformed within the confines of the mold to provide a homogenous metalized microstructure. The mold and any sacrificial layers are then removed to leave only the metalized microstructures intact. Preferably, the base to which the microstructures adhere comprises a prefabricated monolithic integrated circuit having at least a portion of control and readout circuitry contained therein.

Advantages of this invention will be more fully understood and appreciated from the following detailed description taken together with the accompanying drawings.

BRIEF DESCRIPTION OF THE DRAWINGS

FIGS. 2a though 2f show various points in the process of a manufacturing method according to the invention.

DETAILED DESCRIPTION OF THE PREFERRED EMBODIMENT

Figure 1A:
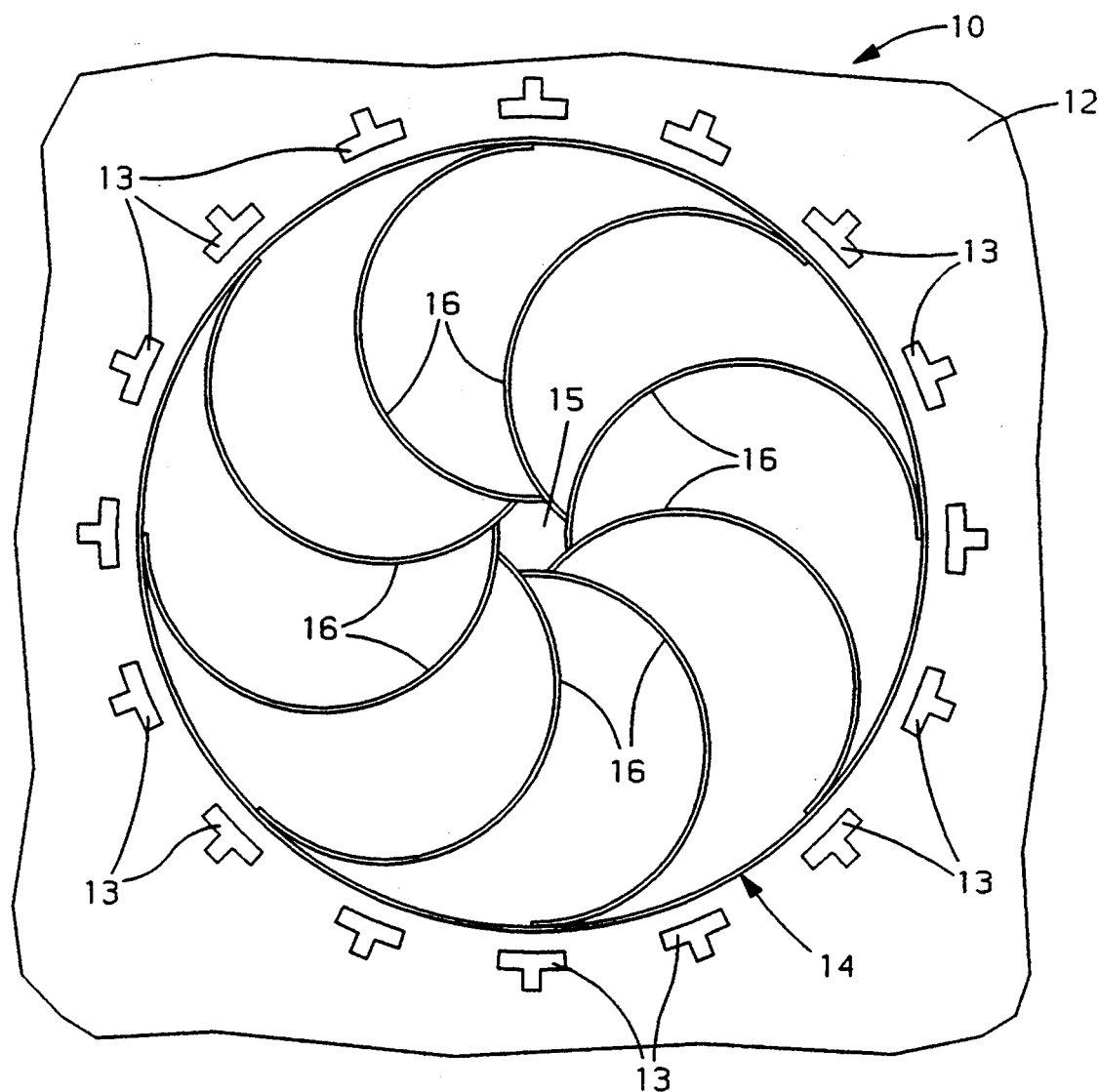
FIGS. 1a and 1a b show top and side views of a microstructure according to the invention.
Figure 1B:
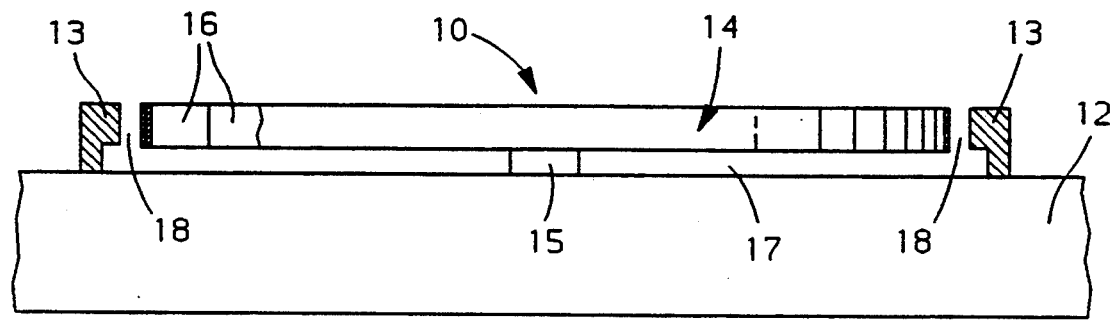
Figure 4A:
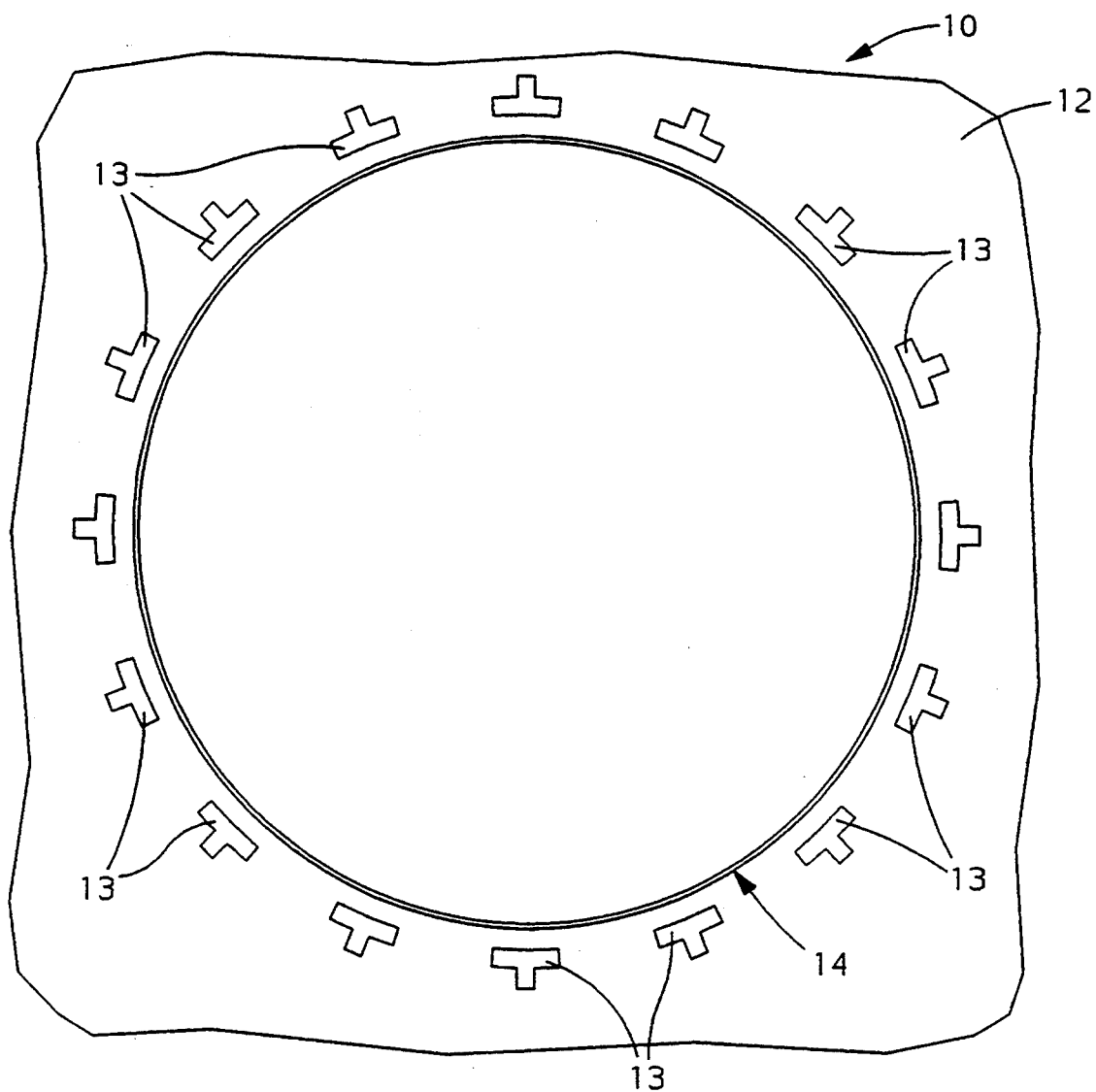
FIGS. 4a and 4b show top and side views of a microstructure according to the invention taking the form of a cylinder.
Figure 4B:
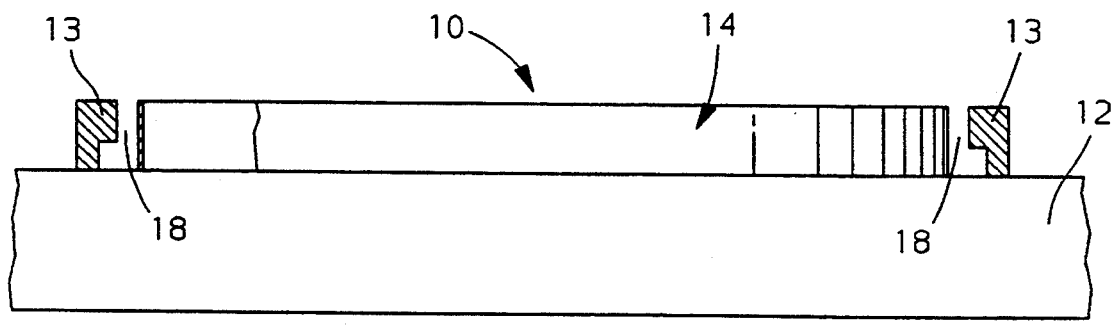

Referring now to FIGS. 1a and 1b, top and side views of a micromachined vibratory gyroscope are generally designated as numeral 10. Base 12 provides the foundation for all microstructures comprising the rotation sensing device. Conventional silicon substrates provide adequate foundation for the microstructures which it will support. FIG. 1a shows a top view of a preferred embodiment according to the invention. Ring 14 is shown concentric with support hub 15. Eight equally distributed semicircular spokes 16 couple ring 14 to hub 15. FIG. 1a b shows that hub 15 is coupled to base 12 whereas all lower surfaces of ring 14 spokes 16 are free standing away from base 12 as illustrated by gap 17 therebetween. An alternate embodiment illustrated in FIGS. 4a and 4b takes the form of a cylinder comprising ring 14 attached at one end thereof to the base 12 with the opposite end thereof free to support radial vibrations. Other numerals in FIGS. 4a and 4b which are common with numerals illustrated in FIGS. 1a and 1b designate common features as previously described with reference to FIGS. 1a and 1b. However, as between these two exemplary embodiments, the former is preferred since all motion is in the plane of the base whereas the latter has some vibration perpendicular thereto and coupled to the base through the attached end of the cylinder thus damping a portion of the energy not otherwise damped in the former embodiment. Angular gain (the amount of precession for a given rotation) is greater in the former embodiment where all of the energy is retained in plane and is therefore preferred. An alternative spoke geometry has a meandering or 'S' shape in the plane of the base. A meandering shape spoke may comprise radially aligned arc portions of a plurality of discontinuous concentric rings coupled radially at alternating pairs of arc ends by portions of a plurality of discontinuous radial members extending from a central hub to a vibratory ring.

In the preferred exemplary embodiment having a hub and semicircular spokes as illustrated, eight spokes 16 are shown. A greater number of spokes may be used with greatly reduced sensitivity and accuracy of the device. However, it is generally true that any octonary multiple of spokes will provide the greatest sensitivity and accuracy possible for a hub and spoke support structure. Where an octonary multiple of spokes is used, damping effects upon a standing wave pattern introduced thereby are symmetrical about the ring. The frequency of the standing wave pattern at any location or alignment is therefore the same. Where a number of spokes not an octonary multiple is used, damping effects are asymmetrical and support standing wave patterns of varying frequencies depending on alignment. A standing wave pattern would have the tendency to drift to an alignment which offers the least resistance to its motion—that is the least damped alignment. Therefore, any non-octonary spoke structure introduces undesirable drift in the device. An arrangement of eight spokes is most desirable for reasons of overall minimal radial stiffness, minimal material usage, and simplification of manufacture for any given octonary multiple.

Figure 3:
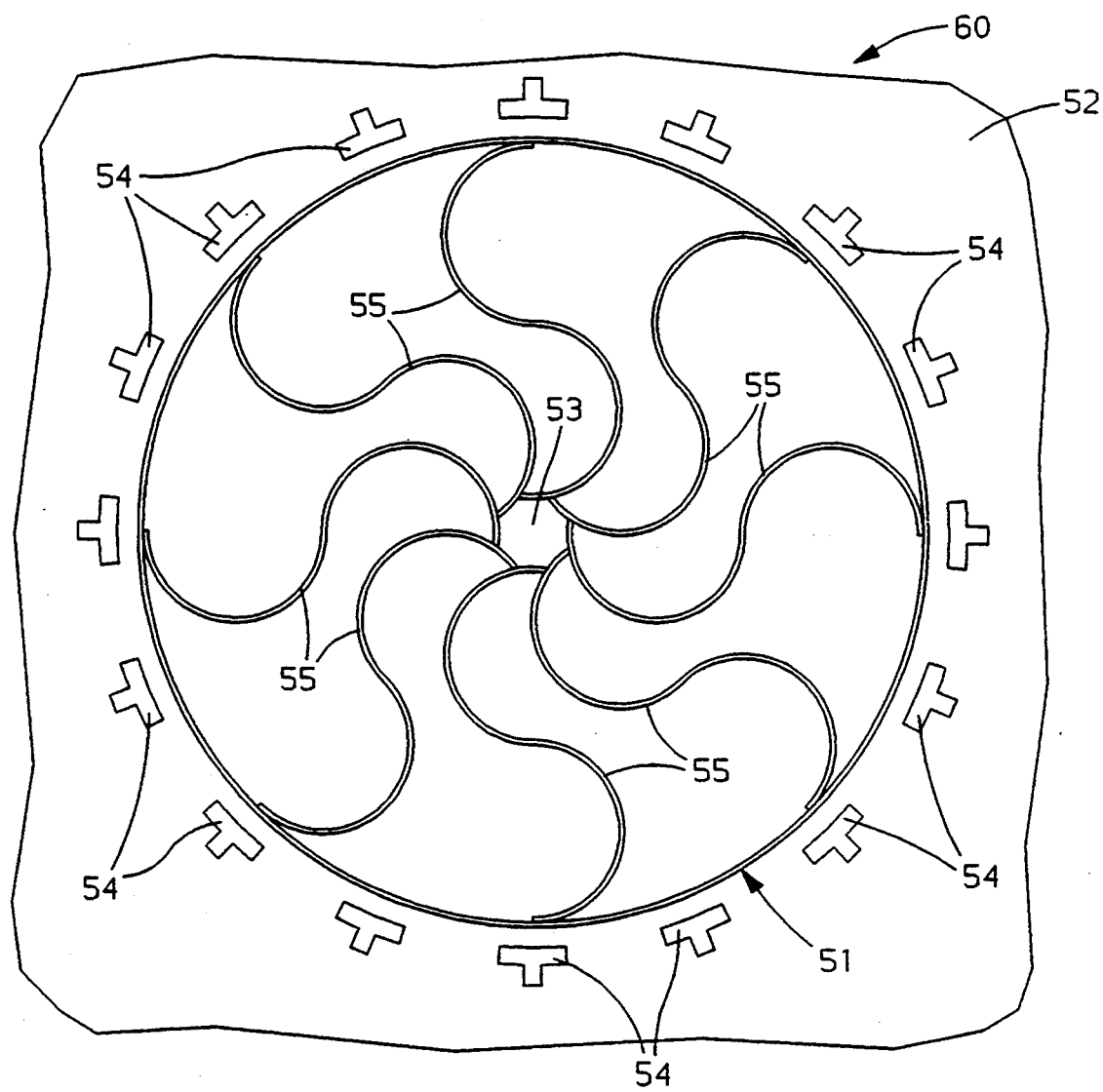
FIG. 3 shows a top view of a microstructure according to the invention having meandering spokes.

An exemplary meandering spoke embodiment of the invention is shown with reference to FIG. 3. Eight meandering spokes 55 are shown coupling hub 53 to ring 51. Base 52 supports the hub 53 and charge conductive sites 54. The entire micromachined vibratory gyroscope comprising meandering spokes is designated 60. Functionally, gyroscope 60 is substantially identical to gyroscope 10 illustrated in FIG. 1a.

Shown also in FIGS. 1a and 1a b are a multiplicity of charge conductive sites 13 disposed symmetrically around the outer perimeter of ring 14 and adjacent thereto in substantial proximity thereto therewith. The gap therebetween is readily seen as numeral 18 in FIGS. 1a or 1b. Prior art generally references such charge conductive sites as pick-offs or drive electrodes depending upon function. The arrangement of charge conductive sites 13 shown in FIG. 1a is illustrative of at least one configuration adequate for detection and drive of a resonant standing wave pattern in ring 14. A specific control and readout circuit, while beyond the scope of the present description regarding the microstructure and a method of manufacture thereof may be referenced more fully in applicant's co-pending U.S. patent application Ser. No. 08/011554, also assigned to the assignee of the present invention Additional charge conductive sites not shown may be added depending on the particular device application, precision requirements and associated circuitry.

Base 12, while shown in the exemplary embodiment of FIGS. 1a and 1a b as a conventional silicon substrate, may also comprise prefabricated circuitry as a monolithic integrated circuit. In fact, a preferred embodiment encompasses at least a portion of device circuitry being incorporated within base 12 and ohmically coupled to the microstructures via exposed metalization sites. It is anticipated that by providing at least a buffer circuit in proximity to each capacitive site that the signal integrity will be greatly improved over that obtainable using more remote circuitry since the charge conductive sites register relatively small capacitive changes which are relatively easily attenuated.

It is desirable in fabrication of the ring to maximize its height perpendicular to the plane of base 12. This would increase surface area around the perimeter which translates into larger capacitive charges being formed at correspondingly larger charge conductive sites 13 thereby making the device less sensitive to attenuation of the signals at the charge conductive sites.

To the extent that the height of the microstructures permits, it is desirable to increase the diameter of ring 14 since a larger diameter will decrease the in plane natural frequency of the ring. Decreasing the natural frequency of ring 14 yields increased sensitivity and decreased drift since these two parameters are frequency sensitive. As ring diameter is increased, out of plane natural frequencies of the structure are decreased thus narrowing the gap between the in plane natural frequency and the out of plane natural frequency. It is desirable that any out of plane natural frequencies remain greater than the natural frequencies of the in plane natural frequency on ring 14 at least to the extent that the out of plane natural frequency does not interfere with detection of the in plane natural frequency via increased signal (in plane) to noise (out of plane). For example, a frequency equal to or greater than the three decibel point on the in plane resonant frequency response curve is desirable for any out of plane natural frequency of the structure.

Relative to thickness of the ring walls, it is most desirable to fabricate a ring having minimum width since this too lowers the in plane natural frequency which is desirable for the reasons already set forth. Additionally, a less massive ring results which requires less energy input to maintain resonance. However, the particular application for the device will limit the lowering of the in plane resonant frequency. For example, with application to sensing rotation in a motor vehicle, it is not desirable to lower the natural resonant frequency of the ring to the extent that road noise or other vibrations characteristic of automobiles would be introduced into the sensed signals.

Referring now to FIGS. 2a–2f, a fabrication sequence will be described. Fabrication of the free standing vibratory ring portion of the rotation sensing device will be discussed in detail. The figures illustrate the progression through the process as described with identical reference numbers corresponding to identical features. Substrate 30 is shown and comprises a silicon substrate material which may comprise a prefabricated monolithic integrated circuit as previously described. Aluminum interconnect 32 is primarily for ohmic contact to integrated circuitry contained within substrate 30 or comprises a portion of electrical traces for coupling to circuitry external to substrate 30. A passivation layer 31 such as conventional plasma deposited silicon nitride or alternatively a low temperature oxide is provided upon substrate 30 and contact holes are opened above all aluminum interconnect areas. FIG. 2a illustrates substrate 30 having aluminum interconnect 32 exposed through passivation layer 31 to define base 12'.

Ohmic and structural portions of adhesion sites are next established above and adjacent to aluminum interconnects respectively. Ohmic portions function primarily to electrically couple the microstructure to the aluminum interconnects while structural portions adjacent thereto are established for mechanical coupling. Preferably, a 100 nanometer barrier layer 33 of a titanium/tungsten alloy followed by a 200 nanometer plating layer 34 of gold are deposited by sputtering. A protective layer 45 of tungsten approximately 100 nanometers is then similarly deposited. Protective layer 45 prevents gold plating layer 34 from reacting with an aluminum sacrificial layer deposited after adhesion site definition processing and described at a later point. Patterning is next performed to define the adhesion sites onto which the microstructures will be deposited. The tungsten protective layer 45 is etched away in a carbon tetrafluoride ($CF_4$) over all areas not defining an adhesion site. The gold layer is next patterned geometrically similar using a wet chemical etch solution of potassium iodide ($KI/I_2$) after which the titanium/tungsten alloy is similarly patterned in a carbon tetrafluoride ($CF_4$) plasma. Gold is the preferred plating base layer since most electro deposits have excellent adhesion thereto, although other materials such as copper or nickel could be used. Titanium/tungsten alloy barrier layer 33 serves the dual purpose of being an adhesion layer for gold plating layer 34 and a diffusion barrier to keep the gold from reacting with aluminum interconnect 32.

With the ohmic and structural portions of adhesion sites defined, the next step is the formation of a sacrificial spacer layer indicated by numeral 35 in FIG. 2b. This layer substantially defines space 17 shown in FIG. 1b between base 12 and bottom edges of ring 14 and spokes 16. Opening 36 is provided above adhesions sites through sacrificial spacer layer 35. Preferably, aluminum is deposited by electron beam evaporation as sacrificial spacer layer 35 to a thickness of approximately 3 micrometers. Standard wet chemical etching is then used to pattern the aluminum sacrificial spacer layer 35 from over adhesion sites to establish opening 36 therethrough. FIG. 2b illustrates the processing to this point of a single adhesion site.

The next step in the process is to establish sacrificial plating base layer 37 for the free standing portions of the microstructures. Preferably, a 75 nanometer layer of tungsten is deposited as sacrificial plating base layer 37 to cover sacrificial spacer layer 35 and the adhesion sites. Sacrificial protective layer 38 of approximate thickness 75 nanometers is next deposited over the same areas. This layer preferably comprises aluminum. Sacrificial protective layer 38 is next removed from over the adhesion sites by wet chemical etching in standard aluminum etch to leave the adhesion sites covered with tungsten for the purpose of protecting the gold thereunder from resputtering during further processing to be described at a later point. Sacrificial protective layer 38 is provided to protect sacrificial plating base layer 37 during further processing and as an etch mask in the removal of tungsten left over the gold adhesion site prior to an electroforming operation, both also described at a later point. FIG. 2c is illustrative of the processing to this point.

Mold formation is next performed. A preferred material for mold layer 39 is polyimide which is first spun on to the existing materials and cured to a thickness of approximately 25 micrometers. Mold layer 39 is then patterned to establish the external shapes of the microstructures. Preferably, mask layer 40 comprises a 100 nanometer layer of SOG available from Futurex Corporation which is spun on to the top of existing mold layer 39 and is itself patterned to establish the desired external shapes of the microstructures. A conventional positive photo resist mask is used to pattern layer 40 using carbon tetrafluoride ($CF_4$) as reactive gas in a reactive ion etching process. Pure oxygen is then used as the reactive gas in a reactive ion etching process to etch mold layer 39 down to plating base protective layer 38, thus resulting in near vertical mold walls with minimal undercut. Alternatively, it is possible to use photo sensitive polyimide for layer 39 and ultraviolet exposure to form the mold. After mold definition, tungsten layers 37 and 45 over the gold adhesion sites are removed by wet chemical etching utilizing protective layer 38 as a mask, and plating base protective layer 38 is then itself removed by standard aluminum etch from over sacrificial plating base layer 37 between walls defined in mold layer 39. FIG. 2d is illustrative of processing to this point.

The next step in the fabrication sequence is electroforming of the microstructures. Preferably, a barrett sulfamate nickel process is used to form nickel microstructures. This process is characterized by low stress deposits and high replicating ability. Microstructures are electroformed to near the top of the mold by plating at a predetermined current density for a fixed time. Plating time required is calculated from known plating rates of the barrett sulfamate nickel plating process. While nickel is used in this exemplary embodiment, other materials including nickel alloys can be used in electroforming microstructures. Nickel-iron alloys for example exhibit higher Q than pure nickel and may be a desirable alternative material. FIG. 2e illustrates a completed electroformed microstructure 50 with mold and sacrificial layers still in place. Primed numbers correspond to features similarly numbered in FIGS. 1a and 1b and described earlier in reference thereto.

A final major step in the fabrication sequence is removal of the mold and sacrificial layers to release the microstructures. In this exemplary embodiment with the materials heretofore utilized, the mold is removed by standard $O_2$ plasma ashing and the sacrificial spacer layer is removed by wet chemical processing with a solution of potassium hydroxide and potassium ferrocyanate. FIG. 2f illustrates the free standing microstructure 50 with mold and sacrificial layers removed. FIG. 2f is further more specifically illustrative of ring 14', support 15' and portion of spoke 16' analogous to similarly numbered items in FIGS. 1a and 1b.

For simplicity of description and illustration, none of the charge conductive sites are shown in FIGS. 2a–2f. Charge conductive sites are electroformed in the same processing as the free standing ring 14' and support 15'. Location of charge conductive sites would be as mentioned earlier adjacent to ring 14' separated by a gap therefrom as illustrated in FIG. 1b as numeral 18.

As is common practice with sensors utilizing resonant structures, vacuum packaging is employed to obtain high Q vibration. It is therefore desirable to vacuum package the structure of the present invention in order to maximize Q of the structure. Exemplary vacuum packaging techniques contemplated by the inventors include enclosing the entire chip in a vacuum package using well known hermetic sealing techniques for semiconductors or using a capping wafer and modified flip-chip technology to vacuum package only the free standing portions of the microstructures on the chip level.

The preceding description of a preferred embodiment is offered by way of illustration and example and not by way of limitation or exclusion of other embodiments consistent with the spirit and scope of the invention as defined by the appended claims.

The embodiments of the invention in which an exclusive property or privilege is claimed are defined as follows:

1. A microstructure for a vibratory gyroscope comprising:
   a silicon substrate platform;
   a ring; and
   support means adapted for substantially radially undamped support of the ring from the base.

2. A microstructure for a vibratory gyroscope comprising:
   a base defining a substantially planar surface;
   support member substantially perpendicular to said planar surface;
   a ring; and
   a plurality of equally spaced arcuate members coupling said support member and said ring for supporting said ring coaxially with said support member with a gap provided everywhere therebetween said ring and said planar surface.

3. A microstructure as claimed in claim 2 wherein said ring is charge conductive at substantially all points around the perimeter thereof.

4. A microstructure as claimed in claim 3 further comprising a plurality of charge conductive sites disposed adjacent the perimeter of said ring to form a corresponding plurality of capacitive sites therewith.

5. A microstructure as claimed in claim 3 wherein said base is a monolithic integrated circuit comprising signal conditioning circuitry.

6. A microstructure for a vibratory gyroscope comprising:
   a platform having a rotation sensing axis;
   a substantially ring-like vibratory member concentric with the rotation sensing axis, said vibratory member further being charge conductive;
   support means adapted for substantially radially undamped support of the vibratory member from the platform; and
   a plurality of charge conductive sites disposed adjacent the perimeter of said vibratory member to form a corresponding plurality of capacitive sites therewith.

7. A microstructure as claimed in claim 6 wherein said ring-like vibratory member and said support means comprise an integral substantially cylindrical structure.

8. A microstructure as claimed in claim 6 wherein:
   said platform comprises a monolithic integrated circuit comprising signal conditioning and control means for establishing, maintaining and detecting the position of a standing wave pattern in the vibratory member.

9. A microstructure as claimed in claim 6 wherein said ring-like vibratory member, said support means and said plurality of charge conductive sites comprise nickel.

10. A microstructure for a vibratory gyroscope comprising:
    a platform having a rotation sensing axis;
    a hub secured to the platform and aligned with said axis;
    a substantially ring-like vibratory member concentric with the rotation sensing axis; and
    a plurality of radially compliant spokes extending outward from the hub and securing the vibratory member thereto in suspensory spaced relationship to the platform thereby providing substantially radially undamped support to the vibratory member.

11. A microstructure as claimed in claim 10 wherein said spokes are spaced equally one from the other.

12. A microstructure as claimed in claim 10 wherein:
    said radially compliant spokes are characterized by an arcuate shape from the hub to the vibratory member.

13. A microstructure as claimed in claim 10 wherein:
    each of said plurality of radially compliant spokes is characterized by a meandering shape from the hub to the vibratory member.

* * * * *